United States Patent
Proebstle et al.

(10) Patent No.: US 9,206,762 B2
(45) Date of Patent: Dec. 8, 2015

(54) DEVICE AND METHOD FOR STARTING AN INTERNAL COMBUSTION ENGINE ARRANGED IN A VEHICLE

(71) Applicant: Bayerische Motoren Werke Aktiengesellschaft, Munich (DE)

(72) Inventors: Hartmut Proebstle, Wuerzburg (DE); Sherif Mahmoud, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 107 days.

(21) Appl. No.: 14/023,584

(22) Filed: Sep. 11, 2013

(65) Prior Publication Data

US 2014/0012488 A1 Jan. 9, 2014

Related U.S. Application Data

(63) Continuation of application No. PCT/EP2012/055764, filed on Mar. 30, 2012.

(30) Foreign Application Priority Data

Apr. 19, 2011 (DE) .......................... 10 2011 007 692

(51) Int. Cl.
*F02N 11/00* (2006.01)
*H02P 9/04* (2006.01)
(Continued)

(52) U.S. Cl.
CPC .......... *F02D 45/00* (2013.01); *B60W 30/18018* (2013.01); *F02D 41/042* (2013.01);
(Continued)

(58) Field of Classification Search
CPC ............ F02N 11/0818; F02N 11/0866; F02N 11/0844; F02N 2011/0888; F02D 45/00; F02D 2250/24; F02D 41/042; B60W 30/18018; Y02T 10/48

USPC .......... 290/38 R, 17, 25, 24, 21, 51; 701/113
See application file for complete search history.

(56) References Cited

U.S. PATENT DOCUMENTS

| 2010/0174473 | A1 | 7/2010 | Pursifull et al. |
| 2010/0305820 | A1 | 12/2010 | McGee et al. |
| 2011/0307135 | A1* | 12/2011 | Ikeda et al. ..................... 701/22 |

FOREIGN PATENT DOCUMENTS

| DE | 10 2006 028 334 A1 | 1/2007 |
| DE | 10 2008 041 535 A1 | 3/2010 |

(Continued)

OTHER PUBLICATIONS

International Search Report (PCT/ISA/210) including English translation dated Jul. 12, 2012 (seven (7) pages).
German Search Report with partial English translation thereof dated Dec. 5, 2011 {Ten (10) pages}.

*Primary Examiner* — Javaid Nasri
(74) *Attorney, Agent, or Firm* — Crowell & Moring LLP

(57) ABSTRACT

A device and a method are provided for starting a vehicle internal-combustion engine. An electric machine at least temporarily drives the internal-combustion engine, and a storage unit at least temporarily supplies the electric machine with electric energy. A number of consumer assemblies in the vehicle are drivable at least temporarily by the engine via a respective process-specific connection. A control unit controls at least one consumer assembly in the presence of a consumer assembly control condition in order to generate or increase a load acting upon the internal-combustion engine, and subsequently controls the electric machine for driving the internal-combustion engine in the presence of an internal-combustion engine start condition.

16 Claims, 3 Drawing Sheets

(51) Int. Cl.
  *F02D 45/00* (2006.01)
  *B60W 30/18* (2012.01)
  *F02D 41/04* (2006.01)
  *F02N 11/08* (2006.01)

(52) U.S. Cl.
  CPC ........ *F02N11/0818* (2013.01); *F02D 2250/24* (2013.01); *F02N 11/0844* (2013.01); *F02N 11/0866* (2013.01); *F02N 2011/0888* (2013.01); *Y02T 10/48* (2013.01)

(56) References Cited

FOREIGN PATENT DOCUMENTS

| | | |
|---|---|---|
| DE | 10 2009 047 981 A1 | 4/2011 |
| EP | 1 591 657 A2 | 11/2005 |
| GB | 2 427 656 A | 1/2007 |

\* cited by examiner

DEVICE AND METHOD FOR STARTING AN INTERNAL COMBUSTION ENGINE ARRANGED IN A VEHICLE

CROSS REFERENCE TO RELATED APPLICATIONS

This application is a continuation of PCT International Application No. PCT/EP2012/055764, filed Mar. 30, 2012, which claims priority under 35 U.S.C. §119 from German Patent Application No. DE 10 2011 007 692.1, filed Apr. 19, 2011, the entire disclosures of which are herein expressly incorporated by reference.

BACKGROUND AND SUMMARY OF THE INVENTION

The invention relates to a device and a method for starting an internal-combustion engine arranged in a vehicle. The following are provided for starting the internal-combustion engine: an electric machine designed for at least temporarily driving the internal-combustion engine, and a storage unit designed for at least temporarily supplying the electric machine with electric energy. Furthermore, the vehicle has a number of consumer assemblies which can be driven at least temporarily by the internal-combustion engine by way of a respective process-specific connection.

Vehicles are currently used which require a starting behavior that is modified in comparison to that of a conventional vehicle. This applies, for example, to a vehicle that is equipped with a so-called automatic start-stop system, or also to a hybrid vehicle. By means of an automatic start-stop system, the internal-combustion engine is switched off when the vehicle is at a standstill or when there is a falling below a vehicle speed threshold value. In the case of a hybrid vehicle, particularly in the case of a vehicle constructed as a parallel hybrid, an internal-combustion engine as well as an electric machine are provided for the propulsion. A hybrid vehicle can therefore be moved along even though the internal-combustion engine is switched off or cut off because the electric machine is available for that purpose. The modified starting behavior is connected with new operating strategies, which are conceivable by means of these vehicles or become necessary for these vehicles.

In the case of a conventional vehicle, a first start or initial start of the internal-combustion engine is carried out, which is triggered for the first time by the driver after entering the vehicle at the start of the drive. During a first start, it is not necessary for the internal-combustion engine to provide a defined large torque within a very short time, particularly a torque that correlates with a present vehicle movement condition.

In the case of a vehicle having an automatic start-stop system, in addition to the first start, also a restart and, if the vehicle is constructed as a hybrid vehicle, if required, also an additional start of the motor vehicle has to be carried out. In the case of a restart as well as in the case of an additional start, there is at first no process-specific connection of the internal-combustion engine with the driven wheels of the vehicle, but it is imminent. The restart and the additional start are caused by a control unit installed in the vehicle.

A restart that is to be carried out is recognized when a start-driving signal is present in a defined first vehicle operating state, in which case, this first vehicle operating state may be an idle state of the vehicle in which the vehicle is stationary (vehicle speed=zero), or it may be a first vehicle movement state in which the vehicle has a vehicle speed that is lower than a first threshold value or greater than a second threshold value and lower than a third threshold value. In this vehicle operating state, the internal-combustion engine may be stopped or have a rotational engine speed which is between a cut-off rotational speed and the zero value. An additional start to be carried out is recognized when, in a defined second vehicle operating state, an engine torque demand is present, in which case this second vehicle operating state is a second vehicle movement state, in which the vehicle has a vehicle speed which may assume an arbitrary value from a large range of values, this value range extending from a vehicle speed close to the zero value to a very high vehicle speed, which is defined by the electric driving mode of the hybrid vehicle. Also in this vehicle operating state, the internal-combustion engine may be stopped or have an engine rotational speed which is between a cut-off rotational speed and the zero value. In the idle state of the vehicle as well as in the movement states of the vehicle, the focus is on the fact that the internal-combustion engine is either stopped (rotational engine speed=zero) or carries out a diminishing or decreasing rotational engine movement, the rotational engine speed therefore being between a cut-off rotational speed and the zero value.

The start-driving signal represents an immediately imminent driving start of the vehicle, which is to begin from the idle vehicle state or the first vehicle movement state. It should preferably be a driving start initiated by the driver. The start-driving signal is, for example, a signal which represents the actuation of the clutch pedal by the driver. As an alternative, it may also be an automated driving start that is therefore initiated independently of the driver. The engine torque demand represents a torque which is to be set by the internal-combustion engine in the respective second vehicle movement state in a manner that is dependent on or independent of the driver. A torque to be set in a manner that is dependent on the driver occurs, for example, as a result of an actuation of the accelerator pedal by the driver. In this case, the engine torque demand may therefore be a quantity representing the accelerator pedal actuation. A driver-independent engine torque demand may be generated, for example, by a longitudinal control system, in which case, the longitudinal control system may preferably be an adaptive cruise control system. The cut-off rotational speed is that rotational engine speed of the internal-combustion engine that is present during the cutting-off of the internal-combustion engine, i.e. during or immediately after the interruption of the operative connection to the driven wheels, for example, caused by the actuation of the clutch. The cut-off rotational speed may correspond to the idling rotational speed. However, depending on the operation, it may temporarily be above the idling rotational speed or already below the idling rotational speed.

The restart as well as the additional start of the internal-combustion engine differ from the initial start. During a restart, for example, at a traffic light, a high torque is to be provided within a very short time by the internal-combustion engine; the internal-combustion engine is started more rapidly than during an initial start. During the additional start of the internal-combustion engine, the internal-combustion engine has to provide within a very short time a torque correlating with the vehicle movement state; a very rapid pulling-up of the internal-combustion engine to a desired rotational engine speed is required (reflex start). Compared to an initial start, a restart as well as an additional start are so-called reflex starts.

In the case of a hybrid vehicle, in addition to the initial start, an additional start of the internal-combustion engine also has to be carried out. If the hybrid vehicle is equipped with an automatic start-stop system, a restart of the internal-combustion engine also has to be carried out. In this case, the above-mentioned statements made concerning a vehicle with an automatic start-stop system apply correspondingly.

As mentioned above, it may be necessary to carry out a restart or an additional start of the internal-combustion engine in a vehicle operating state in which a diminishing or decreasing rotational movement of the engine is present, and the internal-combustion engine is therefore in an internal-combustion engine operating state with a rotational engine speed decreasing to a stop. Such a situation may occur, for example, when, at a first point-in-time, an internal-combustion engine stop condition or cut-off condition has been met and, at a later, second point-in-time, an internal-combustion engine start condition has been met, in which case the second point-in-time is within that time period within which the rotational engine speed of the internal-combustion engine decreases or goes to zero. In the least favorable case, the second point-in-time immediately follows the first point-in-time; i.e. the rotational engine speed of the internal-combustion engine existing at the second point-in-time has not yet significantly decreased in comparison to the first point-in-time. In such a "change-of-mind situation", in contrast to the original intention to stop or cut-off the internal-combustion engine, a continued operation or restarting or additional starting of the internal-combustion engine is now desired. An internal-combustion engine stop condition or cut-off condition exists, for example, when the vehicle is in the vehicle idle state or in one of the two vehicle movement states and the operative connection between the internal-combustion engine and the driven wheels of the vehicle is interrupted. Concerning the internal-combustion engine start condition, reference is made to the statements made above.

A "change-of-mind-situation" may occur, for example, when a vehicle having an automatic start-stop system comes to a stop at a red traffic light and, because of the presence of the internal-combustion engine stop condition, the internal-combustion engine is cut off, but, immediately after the initiation of the cut-off operation, because of a signal change of the traffic light, a continued drive becomes possible which is why a start-driving signal is generated and the combustion engine has to be started again. At the point-in-time of the restart, the internal-combustion engine has a decreasing rotational-speed course. Such a situation may also occur in the case of a hybrid vehicle when, in a driving situation, the internal-combustion engine is cut off and the propulsion of the vehicle takes place exclusively by the electric machine but, immediately after the initiation of the cut-off operation, because of an unpredictable change in the driving operation or in the driving situation, an engine torque demand for the internal-combustion engine is present and the internal-combustion engine has to be started additionally. At the point-in-time of the additional start, the internal-combustion engine has a decreasing rotational-speed course. In the case of such driving-maneuver-relevant restart or additional-start demands, the starting operation of the internal-combustion engine has to take place as rapidly as possible from different cut-off rotational speeds of the internal-combustion engine. A so-called reflex start has to be carried out.

The following problem will now occur in the case of a reflex start, during which a restart or additional-start operation of the internal-combustion engine therefore is to take place immediately after the initiation of the cut-off operation: As a result of the fact that the restart or additional-start operation takes place immediately following the cut-off operation, the rotational speed of the internal-combustion engine has not yet significantly decreased with respect to the cut-off rotational speed. However, it is a fact that conventional engine-bound 12V starters can take over and restart the internal-combustion engine only at a sufficiently low rotational engine speed of the internal-combustion engine, in which case the sufficiently low rotational engine speed is clearly below the cut-off rotational speed and preferably close to the rotational speed of zero. This would mean that when such a conventional starter is used, a correspondingly long time period would have to pass and there would have to be a waiting period before a restarting or additional starting operation could be initiated. This time gap leads to an impairment of the vehicle drivability and is therefore perceived as a disadvantage by the driver, which makes it unacceptable.

Starting systems are nevertheless already commercially available which are reflex-start-capable and by means of which, immediately after the initiation of a cut-off operation, a restart or additional-start operation can therefore be carried out. In the case of such starting systems, specially designed electric machines are used for driving the internal-combustion engine, such as so-called freewheel-bound pinion starters. However, such pinion starters have the disadvantage that they are expensive and cannot be used in all vehicle types.

It is therefore an object of the present invention to further develop a device and a method of the above-mentioned type in order to be able to implement as rapidly as possible, following an already initiated cut-off operation, a restart or additional start of an internal-combustion engine and to thereby reduce or eliminate the impairment of the vehicle drivability caused by the deceleration time of the internal-combustion engine. In particular, it should be possible to be able to implement a reflex start by use of a conventional starter, i.e. to be able to carry out, immediately following an initiated cut-off operation, a restart or additional start of the internal-combustion engine. On the whole, a cost-effective device that is easy to implement and a corresponding method are to be provided wherein the additional-start or restart availability is increased in so-called "change-of-mind-situations".

This and other objects are achieved by a device of the above-mentioned type which has a control unit designed for controlling at least one consumer assembly when a consumer assembly control condition is present, in order to generate and/or to increase a load affecting the internal-combustion engine, and subsequently to control the electric machine for driving the internal-combustion engine, when an internal-combustion engine start condition is present.

The object is further achieved by a method of the above-mentioned type, wherein the following steps take place in a control unit:

(a) controlling at least one consumer assembly when a consumer assembly control condition is present, in order to generate and/or to increase a load affecting the internal-combustion engine, and (b) controlling the electric machine for driving the internal-combustion engine, when an internal-combustion engine start condition is present.

The device according to the invention and the method according to the invention are based on the following. Via an intelligent operating strategy by which consumer assemblies, which are installed in the vehicle anyhow and are therefore connected when a consumer assembly control condition is present, a load acting upon the internal-combustion engine is generated or a possibly already present load is increased. This change in the load acting upon the internal-combustion engine (either starting from the zero load value or a load value different from zero), in the case of a decelerating internal-combustion engine, results in a change in the braking torque and thus in the engine rotational speed, more precisely, in an increased reduction of the rotational engine speed. As a result, the deceleration time of the internal-combustion engine, which is the time period which passes until the internal-combustion engine, starting from a cut-off rotational speed, reaches an engine rotational speed at which the electric machine can take over the internal-combustion engine for implementing a restart or an additional start, is considerably reduced. It thereby becomes possible to be able to carry out a restart or additional start of the internal-combustion engine immediately after an initiated cut-off operation, even if the vehicle is equipped with a conventional starter. A reflex start can therefore be carried out by use of a conventional starter. The impairment of the vehicle drivability caused by a disproportionately long deceleration time of the internal-combustion engine can therefore be reduced or eliminated, whereby the availability of an additional start or a restart is increased in so-called "change-of-mind situations". In addition, the invention can easily be integrated in current starting and vehicle power supply configurations, since only a software adaptation is required for this purpose.

The above-mentioned object has therefore been completely achieved.

In a further development of the invention, the consumer assembly control condition will exist when an operative connection between the internal-combustion engine and the driven wheels is interrupted and the internal-combustion engine has, at least temporarily, a decreasing internal-combustion engine rotational-speed course. By means of this condition, it can be unambiguously and reliably determined whether a vehicle operating condition is present in which the consumer assemblies installed in the vehicle are to be controlled and therefore to be connected, in order to achieve a reducing of the deceleration time of the internal-combustion engine. The unambiguousness and reliability is achieved in that, in addition to the internal-combustion engine stop condition—the operating connection between the internal-combustion engine and the driven wheels is interrupted—, it is checked whether the rotational engine speed of the internal-combustion engine is decreasing. Theoretically and therefore as an alternative, it would also be sufficient for only the internal-combustion engine stop condition to be examined as a consumer assembly control condition.

In a further development of the invention, the internal-combustion engine start condition is present when, in a first vehicle operating state, a start-driving signal is present and/or when, in a second vehicle operating state, an engine torque demand is present. It can therefore be unambiguously determined whether or when a restart (first vehicle operating state) or an additional start (second vehicle operating state) of the internal-combustion engine is required. Preferably, the first vehicle operating state is a vehicle idling state, in which the vehicle is stationary, or a first vehicle movement state, in which the vehicle has a vehicle speed that is lower than a first threshold value or which is greater than a second threshold value and lower than a third threshold value. The invention can therefore be used in the case of a restart to be carried out in a vehicle idling condition as well as in the case of a restart to be carried out in a vehicle movement condition. The first threshold value may, for example, be close to zero, preferably have the value of 3 km/h, which occurs in the case of vehicles equipped with a conventional automatic start-stop system.

In the case of such a conventional automatic start-stop system, the first threshold value may preferably also amount to 5 km/h or even 7 km/h. In the case of vehicles which are equipped with a further developed automatic start-stop system, the first threshold value may be in a range of from 20 km/h to 50 km/h. Preferably, the first threshold value amounts to 20 km/h, 30 km/h or 50 km/h. The second threshold value may have the values 3 km/h, 5 km/h or 7 km/h, and the third threshold value may have the values 20 km/h, 30 km/h or 50 km/h. The vehicle idling state is defined such that the vehicle is stationary (vehicle speed=zero). Further, the second vehicle operating state preferably is a second vehicle movement state, in which the vehicle has a vehicle speed which can assume an arbitrary value from a large value range. This value range extends from a vehicle speed close to the zero value to a very high vehicle speed which is defined by the electric driving mode of the hybrid vehicle. The additional start of the internal-combustion engine should therefore be possible starting from very low vehicle velocities almost close to zero, to very high vehicle velocities which may, for example, be at 50 km/h or 70 km/h or 100 km/h or at clearly higher values.

The invention can advantageously be used in differently configured vehicles, thus, for example, in a vehicle having an automatic start-stop system, in which case it is insignificant whether the vehicle is equipped with a manual transmission or an automatic transmission. The automatic start-stop system may be constructed such that the internal-combustion engine stop condition is present when the vehicle is stationary (vehicle speed=zero) or when the vehicle has a vehicle speed that is lower than a first threshold value or when the vehicle has a vehicle speed that is greater than a second threshold value and lower than a third threshold value. The invention may also be used in a hybrid vehicle. The invention can preferably also be used in a vehicle which has a restarting functionality as well as an additional starting functionality, thus, for example, in the case of a hybrid vehicle with an automatic start-stop system.

Furthermore, the invention can advantageously be used within the scope of the implementation of an arbitrary starting operation, which is to be carried out during the driving operation of a vehicle and which differs from a first or initial start.

In a further development of the invention, the control unit is further designed for controlling the electric machine for driving the internal-combustion engine when a value representing the internal-combustion engine rotational speed is lower than or equal to a threshold value. By means of this measure, it is ensured that the electric machine will not be controlled before the rotational engine speed of the internal-combustion engine has reached a value at which, without any problems and without being damaged in the process, the electric machine can take over the internal-combustion engine and can therefore start it again. This permits the use of conventional starters. In this case, it may be provided that the threshold value corresponds to a value different from zero, which means that the electric machine takes over or restarts a decelerating internal-combustion engine. However, it may also be provided that the threshold value corresponds to the zero value, which means that the electric machine takes over or restarts a stopped internal-combustion engine.

In a further development of the invention, the control unit is, in addition, designed for terminating the controlling of the consumer assembly when the internal-combustion engine start condition is present. As a result of this measure, it is ensured that, as soon as the starting operation begins, by which the internal-combustion engine is started, particularly is to be restarted or additionally started, the generated or increased load acting upon the internal-combustion engine is no longer present, and thereby the internal-combustion engine can be started as rapidly as possible and can generate a defined desired torque. As an alternative or in addition, the controlling of the consumer assembly can also be terminated when the value representing the internal-combustion engine rotational speed is lower than or equal to the pertaining threshold value.

In a further development of the invention, the control unit is further designed for making the number of the consumer assemblies to be controlled dependent on the internal-combustion engine rotational-speed value which is present at the point-in-time at which the consumer assembly control condition has been met, in particular, has been met for the first time. As an alternative or in addition, the control unit is further designed for making the type of control of the consumer assembly dependent on the internal-combustion engine rotational speed value which is present at the point-in-time at which the consumer assembly control condition has been met, particularly has been met for the first time. This measure permits a flexible controlling of the consumer assemblies that is adapted to external circumstances. Thus, it is contemplated to control, during a cut-off operation, which is initiated starting from a high cut-off rotational speed, a larger number of consumer assemblies than during a cut-off operation which is initiated starting from a lower cut-off rotational speed.

As a supplement or alternative, it is also contemplated to control, during a cut-off operation, which is initiated starting from a high cut-off rotational speed, a consumer assembly in such a manner that, as a result, a greater load acts upon the internal-combustion engine than during a cut-off operation that is initiated starting from a lower cut-off rotational speed. It is thereby ensured that the internal-combustion engine can always be restarted or additionally started as rapidly as possible, independently of the amount of the cut-off rotational speed from which the cut-off operation is initiated.

In a further development of the invention, one of the consumer assemblies is a generator which is designed for charging the storage unit at least temporarily. In this case, the control unit is designed for controlling the generator in the presence of the consumer assembly control condition in such a manner that the generator supplies a maximally possible charging current. This measure has the following advantage: the controlling of the consumer assemblies according to the invention for generating or increasing a load acting upon the internal-combustion engine has the result that electric energy is consumed. When now the generator is controlled for the purpose of increasing the load or generating the load, not only energy will be consumed but, to a certain extent, energy is also generated again, which can be stored in the storage unit. This contributes to a favorable energy balance and therefore to a lower fuel consumption.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
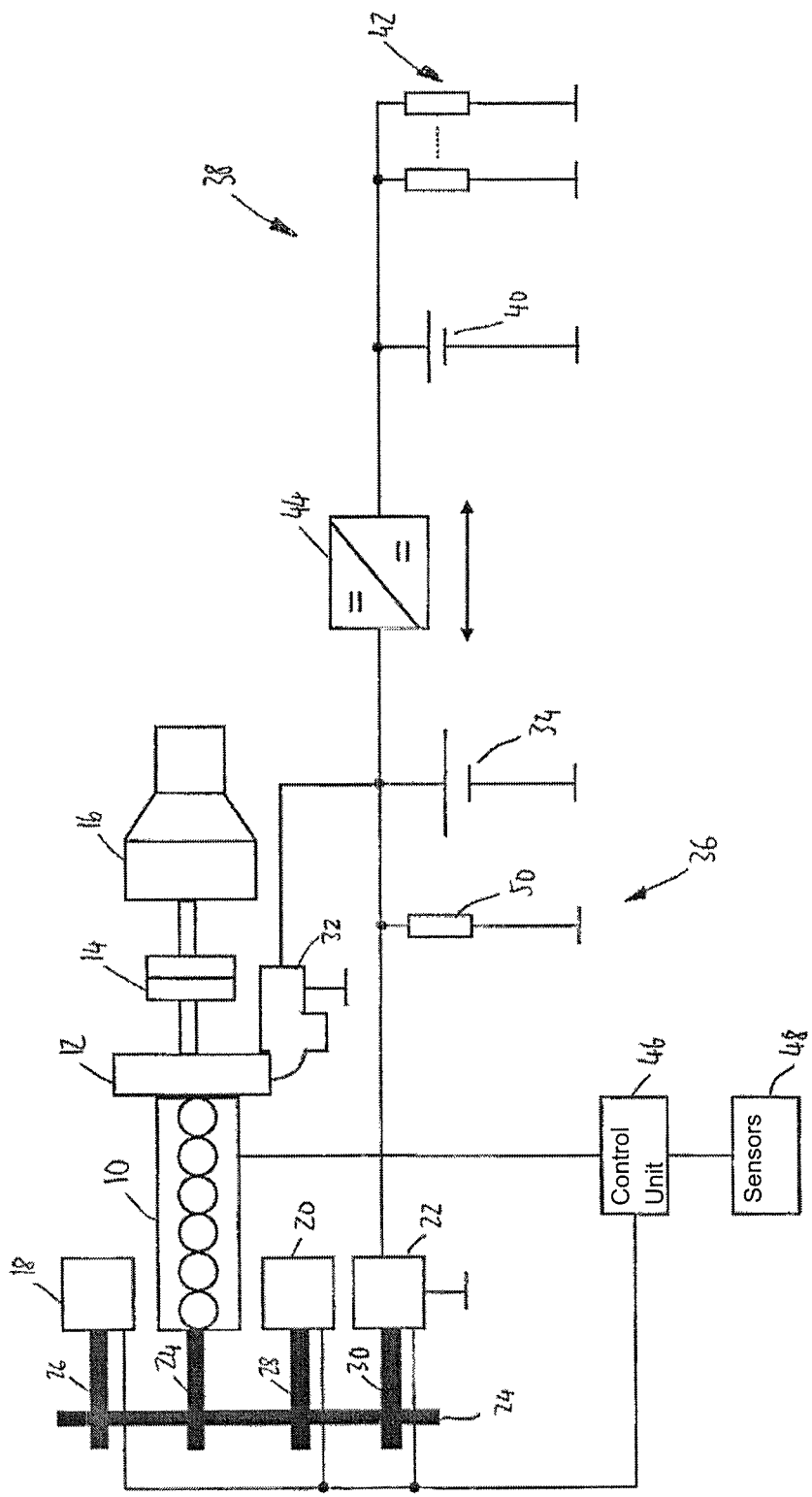
FIG. 1 is a schematic view of a partial vehicle drive train for explaining the invention.

FIG. 1 illustrates an internal-combustion engine 10 arranged in a vehicle. This internal-combustion engine 10 is in an operative connection with a transmission 16 by way of a dual-mass flywheel 12 and a separating clutch 14 in order to drive the driven wheels (which are not shown). The vehicle also has various consumer assemblies. These may be pumps arranged in the vehicle, of which one, specifically the water pump 18, is shown as an example. Additional consumer assemblies are a cooling compressor 20 contained in an air-conditioning system and an electric generator 22. The consumer assemblies can be driven at least temporarily by the internal-combustion engine 10 by way of a respective operative connection, the operative connection each consisting of a main connection line 24 and a respective individual connection line 26, 28, 30.

On the whole, the construction described so far corresponds to that of a conventional vehicle. In the case of a hybrid vehicle, particularly a vehicle implemented as a parallel hybrid, in addition to the internal-combustion engine 10, a correspondingly designed electric machine is provided for the propulsion.

For starting the internal-combustion engine 10, an electric machine 32 is provided. Furthermore, a storage unit 34 is provided, by which the electric machine 32 is supplied at least temporarily with electric energy. The storage unit 34 is part of a first onboard power supply system 36 which is provided for supplying the electric machine 32. The storage unit 34 may, for example, be a lithium-ion battery. The vehicle has a second, conventional power supply system 38, also called a basic power supply system. The second power supply system 38 has an additional storage unit 40 constructed, for example, as a conventional lead acid battery. First consuming devices 42 are supplied with electric energy from the additional storage unit 40. The electric generator 22 is used for charging the storage unit 34 and the additional storage unit 40, in which case the additional storage unit 40 can be connected with the generator 22 by way of a correspondingly designed DC converter 44.

For controlling the internal-combustion engine 10, a control unit 46 is provided. This is an engine control unit to which values or data required for this purpose are supplied that originate from sensors 48. The control unit 46 is further connected with the consumer assemblies, specifically the water pump 18, the cooling compressor 20 and the electric generator 22, for being able to control these assemblies in the presence of a consumer assembly control condition, in order to generate and/or increase a load acting upon the internal-combustion engine 10. Subsequently, when an internal-combustion engine start condition is present, the control unit 46 will start controlling the electric machine 32 for driving the internal-combustion engine 10.

The electric machine 32 may be a 12V starter that is constructed as a pinion starter. The method of operation of such a pinion starter will be described in the following. For reasons of clarity, the pinion starter components mentioned in this connection will not be shown in FIG. 1. In the case of a pinion starter, a pinion can be engaged. It includes at least one engaging relay which, in the event of a demand to start an internal-combustion engine, attracts a relay armature as a result of a magnetic field built-up in a relay coil, whereby the pinion is pushed by way of an engaging lever toward the front against a gear rim of a drive shaft connected with the internal-combustion engine. Simultaneously, the relay armature of the engaging relay, by way of a contact bridge, closes the main circuit of the starter motor between a storage unit and the starter motor, so that the starter motor can start moving (rotating) and can cause the drive shaft, which is connected with it by means of the pinion, and thus the internal-combustion engine to rotate.

In the representation shown in FIG. 1, different functionalities are integrated in the control unit 46. As mentioned above, the control unit 46 contains the functionality of an engine control. Furthermore, in addition to a restart functionality and/or an additional-start functionality, those additional functionality capacities are integrated in the control unit 46 which are required for implementing the invention. However, it is also contemplated that the above-mentioned functionalities are not all integrated in a single control unit but are distributed to a plurality of independent control units.

The control unit 46 is designed for processing additional functionality capacities that are required for implementing the invention. Thus, it is determined in the control unit 46 whether a consumer assembly control condition is present. This is so when the operative connection between the internal-combustion engine 10 and the driven wheels is interrupted and the internal-combustion engine, at least temporarily, has a decreasing internal-combustion engine rotational-speed course. Furthermore, it is determined in the control unit 46 whether an internal-combusting engine start condition is present, which is so when a start-driving signal is present in a first vehicle operating state and/or when an engine torque demand is present in a second vehicle operating state. Furthermore, the control unit 46 is designed for controlling the electric machine 32 for driving the internal-combustion engine 10 when a value representing the internal-combustion engine rotational speed is lower than or equal to a threshold value. In addition, the control unit 46 is designed for terminating the controlling of the consumer assembly, more precisely, the water pump 18, the cooling compressor 20 or the electric generator 22, when the internal-combustion engine start condition is present. The control unit 46 is further designed for making the number of the consumer assemblies to be controlled and/or the type of the controlling of the respective consumer assembly dependent on the internal-combustion engine rotational value which is present at the point-in-time at which the consumer assembly control condition has been met. If the generator 22 is controlled for generating and/or increasing a load acting upon the internal-combustion engine, the control unit 46 will be designed for controlling the generator such that the latter supplies a maximally possible charging current.

The control unit 46 permits the following operating strategies according to the invention: the consumer assemblies 18, 20, 22, which are installed in the vehicle anyhow, are controlled and thereby connected when the consumer assembly control condition is present. As a result, a load is generated that acts upon the internal-combustion engine 10, or a possibly already existing load is increased, whereby the deceleration time of the internal-combustion engine 10 is reduced. It thereby becomes possible to be able to carry out a restart or additional start of the internal-combustion engine 10 immediately following an initiated cut-off operation. A reflex start can be carried out by use of a conventional starter.

As mentioned above, various values, signals or data can be supplied to the control unit 46, which originate from the sensors 48. These are those required for implementing the implementation of the engine start functionality and of which here only a few examples are mentioned. For example, a value representing the internal-combustion engine rotational speed, a value representing the internal-combustion engine temperature and/or a value representing the accelerator pedal position may be supplied. Furthermore, values, signals or data are to be supplied to the control unit 46 which are required for the implementation of the restart functionality and/or of the additional-start functionality and of the additional functionality capacities necessary for the implementation of the invention.

With reference to the initial statements, it is to be determined with respect to the restart functionality and/or the additional functionality whether the vehicle is stationary or driving. A value representing the vehicle speed therefore is to be supplied. In addition, a value representing the engine rotational speed as well as a start-driving signal and a value representing an existing engine torque demand are to be supplied.

With respect to the additional functionality capacities which are necessary for implementing the invention, the following values, signals or data are to be supplied to the control unit 46. In order to be able to determine whether the consumer assembly control condition is present, information is required as to whether the operative connection between the internal-combustion engine 10 and the driven wheels is interrupted. For this purpose, for example, a value representing the actuation of the clutch pedal is to be supplied to the control unit 46. Furthermore, information is required as to whether a decreasing internal-combustion engine rotational-speed course is present, which is why a value is to be fed which represents the engine rotational speed. Furthermore, it is determined in the control unit 46 whether the internal-combustion engine start condition is present. Concerning the values, signals or data to be analyzed for this purpose in the control unit and therefore to be supplied to the latter, reference is made to the statements concerning the restart functionality and the additional-start functionality.

The schematic representation illustrated in FIG. 1 should have no limiting effect on the onboard power supply configuration or the topology of the onboard power supply system. The partial FIGS. 2a, 2b and 2c to be described below illustrate different onboard power supply configurations, for which the invention is used. For the purpose of completeness, it should be mentioned that the first onboard power supply system 36 has second consuming devices 50.

Figure 2A:
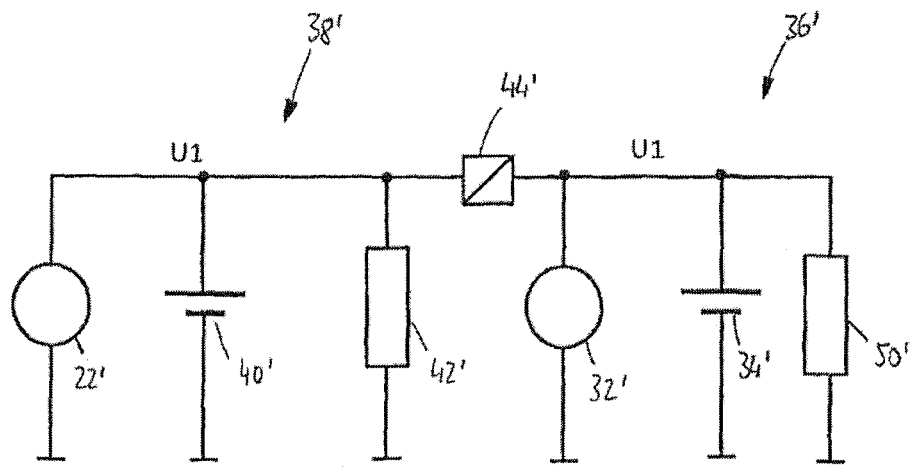
FIGS. 2a-2c are three partial figures of different onboard power supply configurations, in which the invention can be used.

Partial FIG. 2a illustrates a second conventional onboard power supply system 38' (basic power supply system), which is connected by way of a DC converter 44' with a first onboard power supply system 36'—a so-called separate additional-start power supply system. By means of the DC converter 44', the two power supply systems are separated. Such an expanded power supply system configuration is used, for example, in a vehicle having an automatic start-stop system, where an additional start or a restart of the internal-combustion engine is to be carried out. This power supply system configuration can also be used in the case of a hybrid vehicle, by which a restart of the internal-combustion engine is to be carried out. The first onboard power supply system 36' has a storage unit 34' for providing a 12V voltage U1 and second consuming devices 50'. An electric machine 32' is connected with the storage unit 34'. The second onboard power supply system 38' has a generator 22', an additional storage unit 40' and first consuming devices 42'. The storage unit 34' and the additional storage unit 40' can be charged by way of the generator 22'.

Figure 2B:
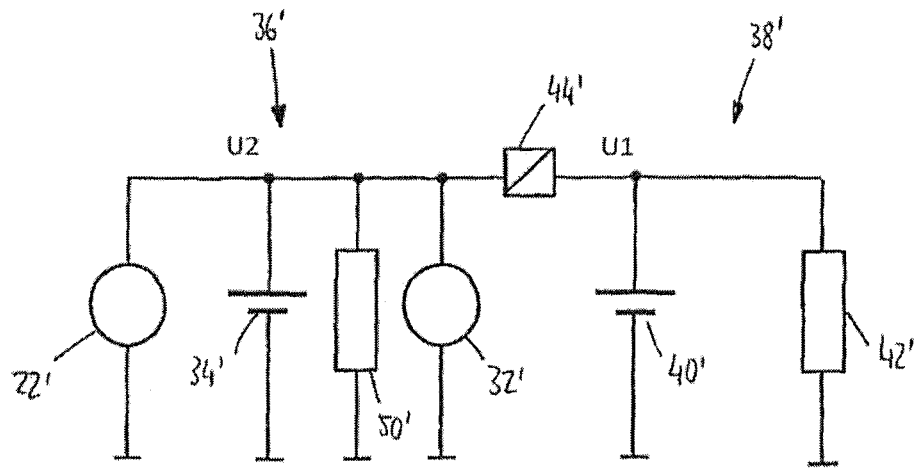

The power supply system configuration illustrated in partial FIG. 2b corresponds to the onboard power supply system configuration illustrated in FIG. 1. A second, conventional onboard power supply system 38' is coupled by way of a DC converter 44' with a first onboard power supply system 36'. The first onboard power supply system 36' is a so-called additional-start onboard power supply system. The second onboard power supply system 38' has a further storage unit 40' and first consuming devices 42'. An electric machine 32' is connected with a storage unit 34' contained in the first onboard power supply system 36'. The first onboard power supply system 36' further has a generator 22' and second consuming devices 50'. The onboard power supply system configuration illustrated in partial FIG. 2b can, for example, be used in a vehicle, which is constructed as a mild-hybrid vehicle or as a micro-hybrid vehicle. The onboard power supply system voltage U2 of the first onboard power supply system 36' should, for example, be between 20V and 60V, while the onboard power supply system voltage of the second onboard power supply system 38' should be 12V.

Figure 2C:
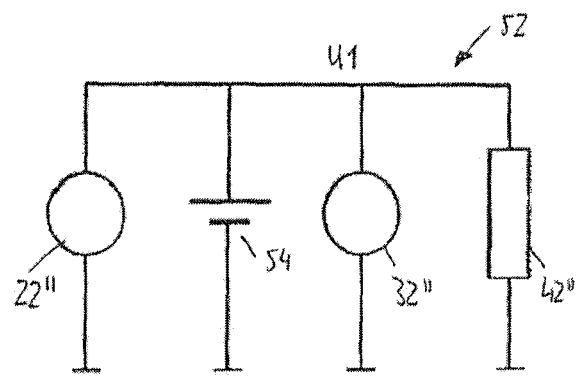

Partial FIG. 2c shows a basic onboard power supply system 52 as used in the case of vehicles that are equipped with an automatic start-stop system, where a restart is carried out when a vehicle idling state or a first vehicle movement state is present in which the vehicle speed is lower than a first threshold value, preferably 3 km/h. The basic onboard power supply system 52 has a generator 22", a storage unit 54, an electric machine 32" and first consuming devices 42".

It should be mentioned at this point that the invention can be used for arbitrary onboard power supply system configurations or topologies of onboard power supply systems, among others, in the case of those illustrated in partial FIGS. 2a, 2b and 2c. This should have no limiting effect. The invention can also be used for further onboard power supply system configurations not described here.

Figure 3:
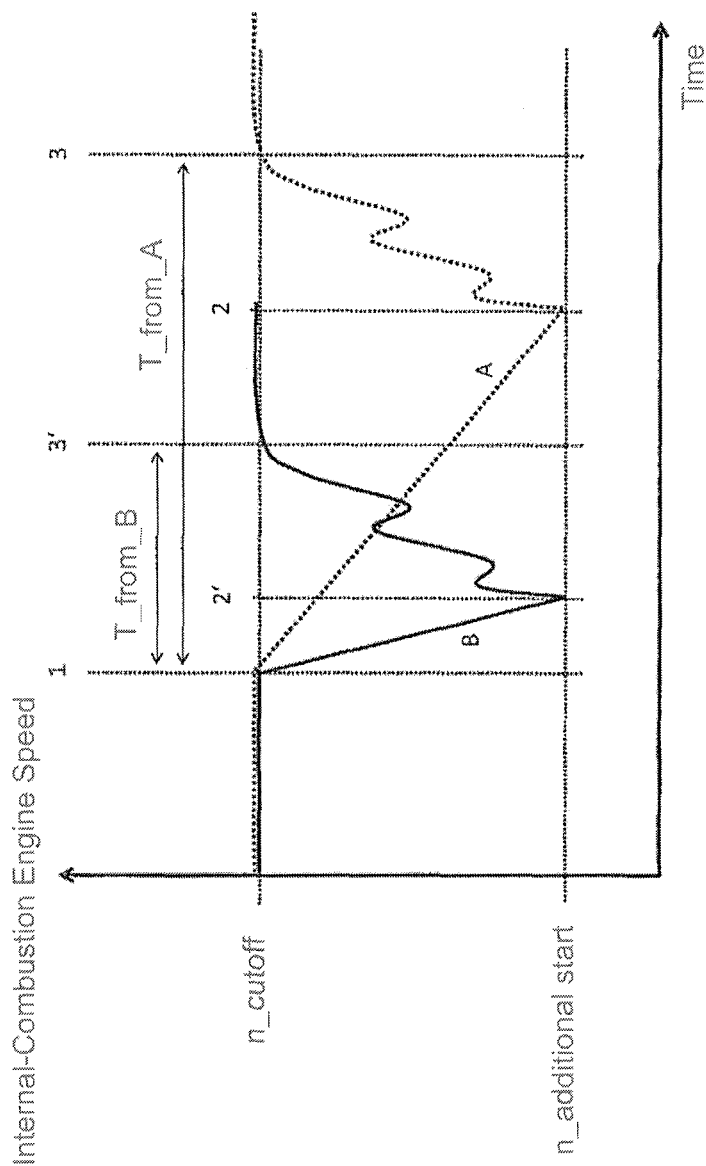
FIG. 3 is a graphical view of two internal-combustion engine rotational speed courses for explaining the invention.

FIG. 3 illustrates two internal-combustion engine rotational-speed courses plotted over time. The course marked A and indicated by a dashed line represents an internal-combustion engine rotational-speed course as it occurs in the case of a start system, in which the invention is not used. Whereas the course marked B and indicated by a solid line represents an internal-combustion engine rotational-speed course as it occurs in the case of a start system in which the invention is used and therefore measures are taken for shortening the starting time.

The abbreviations used in FIG. 3 have the following meaning:

n_cut-off indicates the cut-off rotational speed of the internal-combustion engine 10, which the latter has when the cut-off operation is initiated, i.e. at the point-in-time 1. As a rule, the cut-off rotational speed is greater than 500 r.p.m. The following should be noted at this point. It should have no limiting effect that the rotational-speed course for time periods before the point-in-time 1 extends at the same level. It is definitely contemplated that the rotational speed is already descending in this time segment. As a rule, the cut-off rotational speed is lower than the idling rotational speed of the internal-combustion engine 10. The cut-off operation may be initiated from differently high cut-off rotational speeds, i.e. at the point-in-time 1, a uniform cut-off rotational speed must not necessarily be present.

n_additional start indicates the maximal rotational speed or intercept rotational speed of the internal-combustion engine 10, at which the electric machine 32 can take over and start the internal-combustion engine 10. As a rule, the intercept rotational speed should amount to a value that particularly clearly differs from zero. In this case, the electric machine takes over or restarts a decelerating internal-combustion engine. However, the intercept rotational speed may also amount to 0 r.p.m. In this case, the electric machine takes over and restarts an internal-combustion engine that has come to a stop.

T_from_A or T_from_B indicates that time period that passes until the internal-combustion engine 10, starting from the initiation of the cut-off operation (point-in-time 1), regains its complete internal-combustion-engine-based driving availability. It is therefore that time period that passes until the internal-combustion engine 10, starting from an initiated cut-off operation, is successfully restarted or additionally started. This time period is defined by the points-in-time 1 and 3 or 1 and 3'.

First, the internal-combustion engine rotational-speed course will be discussed that is marked A. At the point-in-time 1, the internal-combustion engine is cut off at a finite cut-off rotational speed n_cut-off; the cut-off operation is initiated. Subsequently, the internal-combustion engine is left to itself. A waiting period has to take place until the internal-combustion engine 10 has reached the intercept rotational speed n_additional start, this time period called a deceleration time being defined by the two points-in-time 1 and 2. At the point-in-time 2, the electric machine constructed as a pinion starter can take over starting the internal-combustion engine 10, which is why the pinion of the pinion starter is engaged whereby the starting operation is initialized. The starting operation lasts for the time period defined by the two points-in-time 2 and 3. For points-in-time after the point-in-time 3, the internal-combustion engine 10 has regained its full internal-combustion-based driving availability. The time duration, which begins with the initiation of the cut-off operation (point-in-time 1) and ends with the achieving of the full internal-combustion-based driving availability (point-in-time 3), is therefore the sum of the deceleration time (point-in-time 1 to point-in-time 2) and the starting time (point-in-time 2 to point-in-time 3).

In the following, the internal-combustion engine rotational-speed course marked B will now be discussed which occurs when a starting system is used in which an embodiment of the invention is implemented and therefore measures for shortening the starting time, more precisely, measures for shortening the deceleration time, are taken. At the point-in-time 1, the internal-combustion engine 10 is cut off; the cut-off operation is initiated. Simultaneously, a consumer assembly control condition is met; then the operative connection between the internal-combustion engine 10 and the driven wheels of the vehicle is interrupted, and a decreasing internal-combustion engine rotational-speed course is present, which is why at least one of the consumer assemblies, specifically the water pump 18, the cooling compressor 20 or the electric generator 22 is controlled in order to generate and/or increase a load acting upon the internal-combustion engine 10. As a result, during this deceleration phase, the braking torque acting upon the internal-combustion engine 1 is clearly increased and, therefore, the intercept rotational speed n_additional start is reached much earlier, specifically at the point-in-time 2'. On the whole, the deceleration time is therefore shortened to a time period that is defined by the points-in-time 1 and 2'. At the point-in-time 2', the electric machine 32 can take over starting the internal-combustion engine 10; the starting operation is initialized. The starting operation lasts for the time period defined by the two points-in-time 2' and 3', which normally corresponds to that starting time of the rotational-speed course marked A which is defined by the two points-in-time 2 and 3. For points-in-time after the point-in-time 3', the internal-combustion engine 10 has regained its full internal-combustion-engine-based driving availability. The time period, which begins with the initiation of the cut-off operation (point-in-time 1) and ends with the achieving of the full internal-combustion-engine-based driving availability (point-in-time 3'), is shortened because the deceleration time (point-in-time 1 to point-in-time 2') is significantly shorter.

The shortening of the deceleration time is achieved, for example, in that preferably all available consumer assemblies, specifically the water pump 18, the cooling compressor 20 and the electric generator 22 are controlled, particularly shortly or immediately after the cut-off of the internal-combustion engine 10, in order to generate and/or increase a load acting upon the internal-combustion engine 10. In this case, the consumer assemblies are preferably operated into the respectively highest possible load point. Thus, for example, for the generator 22, the current delivery is increased, starting from a value of 100 A, that existed before the point-in-time 1, to a value of 250 A for the time after the point-in-time 1. Correspondingly, the cooling compressor 20 can be controlled such that the power drawn by it is increased from 1 kW to 4 kW.

LIST OF REFERENCE NUMBERS

- 10 Internal-combustion engine
- 12 Dual-mass flywheel
- 14 Separating clutch
- 16 Transmission
- 18 Water pump
- 20 Cooling compressor
- 22 Electric generator
- 24 Main connection line
- 26 Individual connection line
- 28 Individual connection line
- 30 Individual connection line
- 32 Electric machine
- 34 Storage unit
- 36 First onboard power supply system
- 38 Second onboard power supply system
- 40 Additional storage unit
- 42 First consuming devices
- 44 DC converter
- 46 Control unit
- 48 Sensors
- 50 Second consuming devices
- 52 Basic onboard power supply system
- 54 Storage unit The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device for starting an internal-combustion engine arranged in a vehicle, wherein the internal-combustion engine is in an operative connection with a transmission by way of a separating clutch in order to drive driven wheels of the vehicle, the separating clutch being operable via a clutch pedal, the device comprising:
   an electric machine coupled to the internal-combustion engine and operatively configured for at least temporarily driving the internal-combustion engine;
   a storage unit coupled to the electric machine and operatively configured to supply the electric machine at least temporarily with electric energy;
   a plurality of consumer assemblies coupled to the internal-combustion engine and drivable at least temporarily by the internal-combustion engine via a respective process-specific connection; and
   a control unit coupled to the internal-combustion engine and the plurality of consumer assemblies, the control unit operatively configured to:
      determine that a consumer assembly control condition is present in response to (i) an operative connection between the internal-combustion engine and the driven wheels being interrupted, and (ii) the internal-combustion engine at least temporarily having a decelerating internal-combustion engine rotational-speed course, wherein the interruption of the operative connection between the internal-combustion engine and the driven wheels is determined by evaluating a value representing an actuation of the clutch pedal,
      control, in response to determining that the consumer assembly control condition is present, at least one of the plurality of consumer assemblies in order to generate or increase a load acting upon the internal-combustion engine, thereby reducing a deceleration time of the internal-combustion engine, and subsequently,
      control the electric machine for driving the internal-combustion engine when an internal combustion engine start condition is present.

2. The device according to claim 1, wherein one of the plurality of consumer assemblies is a generator configured to charge the storage unit at least intermittently; and
   wherein the control unit is operatively configured to control the generator, in the presence of the consumer assembly control condition, such that the generator supplies a maximum charge current.

3. The device according to claim 1, wherein the internal-combustion engine start condition is present when, in a first vehicle operating state, a start-driving signal is present.

4. The device according to claim 1, wherein the internal-combustion engine start condition is present when, in a second vehicle operating state, an engine torque demand is present.

5. The device according to claim 1, wherein the internal-combustion engine start condition is present when, in a first vehicle operating state, a start-driving signal is present and, in a second vehicle operating state, an engine torque demand is present.

6. The device according to claim 1, wherein the control unit is further operatively configured to control the electric machine for driving the internal-combustion engine when a value representing an internal-combustion engine rotational speed is less than or equal to a threshold value.

7. The device according to claim 1, wherein the control unit is further operatively configured to terminate control of the consumer assembly when the internal-combustion engine start condition is present.

8. The device according to claim 1, wherein the control unit is further operatively configured to make a number of consumer assemblies to be controlled dependent on an internal-combustion engine rotational-speed value present at a point-in-time at which the consumer assembly control condition has been met.

9. The device according to claim 1, wherein the control unit is further operatively configured to make a type of control of the consumer assembly dependent on an internal-combustion engine rotational-speed value present at a point-in-time at which the consumer assembly control condition has been met.

10. A method for starting an internal-combustion engine arranged in a vehicle equipped with an electric machine coupled to the internal-combustion engine and configured for at least temporarily driving the internal-combustion engine, a storage unit coupled to the electric machine and configured for supplying the electric machine at least temporarily with electric energy, a plurality of consumer assemblies coupled to the internal-combustion engine and drivable at least temporarily by the internal-combustion engine via a respective process-specific connection, and a control unit coupled to the internal-combustion engine and the plurality of consumer assemblies, wherein the internal-combustion engine is in an operative connection with a transmission by way of a separating clutch in order to drive driven wheels of the vehicle, the separating clutch being operable via a clutch pedal, the method comprising the acts of:

determining, by the control unit, that a consumer assembly control condition is present in response to (i) an operative connection between the internal-combustion engine and the driven wheels being interrupted, and (ii) the internal-combustion engine at least temporarily having a decelerating internal-combustion engine rotational-speed course, wherein the interruption of the operative connection between the internal-combustion engine and the driven wheels is determined by evaluating a value representing an actuation of the clutch pedal, controlling, via the control unit, at least one of the plurality of consumer assemblies in response to determining that a consumer assembly control condition is present, in order to generate or increase a load acting upon the internal-combustion engine, thereby reducing a deceleration time of the internal-combustion engine; and subsequently controlling, via the control unit, the electric machine for driving the internal-combustion engine when an internal-combustion engine start condition is present.

11. The method according to claim 10, wherein the act of controlling at least one consumer assembly further comprises the act of making a number of consumer assemblies controlled dependent on an internal-combustion engine rotational-speed value present at a point-in-time at which the consumer assembly control condition is present.

12. The method according to claim 10, further comprising the act of:

controlling, via the control unit, the electric machine for driving the internal-combustion engine when a value representing an internal-combustion engine rotational speed is less than or equal to a threshold value.

13. The method according to claim 10, further comprising the act of:

when, in a first vehicle operating state, a start-driving signal occurs, determining that the internal-combustion engine start condition is present.

14. The method according to claim 10, further comprising the act of:

when, in a second vehicle operating state, an engine torque demand is present, determining that the internal-combustion engine start condition is present.

15. The method according to claim 10, further comprising the act of:

when, in a first vehicle operating state, a start-driving signal is present and, in a second vehicle operating state, an engine torque demand is present, determining that the internal-combustion engine start condition is present.

16. A computer product for a vehicle equipped with an internal-combustion engine, an electric machine coupled to the internal-combustion engine and configured to at least temporarily drive the internal-combustion engine, a storage unit coupled to the electric machine and configured that supplies the electric machine at least temporarily with electric energy, a plurality of consumer assemblies coupled to the internal-combustion engine and drivable at least temporarily by the internal-combustion engine via a respective process-specific connection, and a control unit coupled to the internal-combustion engine and the plurality of consumer assemblies, wherein the internal-combustion engine is in an operative connection with a transmission by way of a separating clutch in order to drive driven wheels of the vehicle, the separating clutch being operable via a clutch pedal, the computer product comprising:

a computer readable medium for the control unit, the computer readable medium having stored thereon program code segments that:

determine that a consumer assembly control condition is present in response to (i) an operative connection between the internal-combustion engine and the driven wheels being interrupted, and (ii) the internal-combustion engine at least temporarily having a decelerating internal-combustion engine rotational-speed course, wherein the interruption of the operative connection between the internal-combustion engine and the driven wheels is determined by evaluating a value representing an actuation of the clutch pedal, control at least one of the plurality of consumer assemblies, in response to determining that a consumer assembly control condition is present, in order to generate or increase a load acting upon the internal-combustion engine, thereby reducing a deceleration time of the internal-combustion engine; and subsequently control, the electric machine for driving the internal-combustion engine when an internal-combustion engine start condition is present.

\* \* \* \* \*